(No Model.) 2 Sheets—Sheet 1.
A. HELZEL.
MUFFLE FURNACE FOR TREATING GLASS OR POTTERY WARE.
No. 590,737. Patented Sept. 28, 1897.
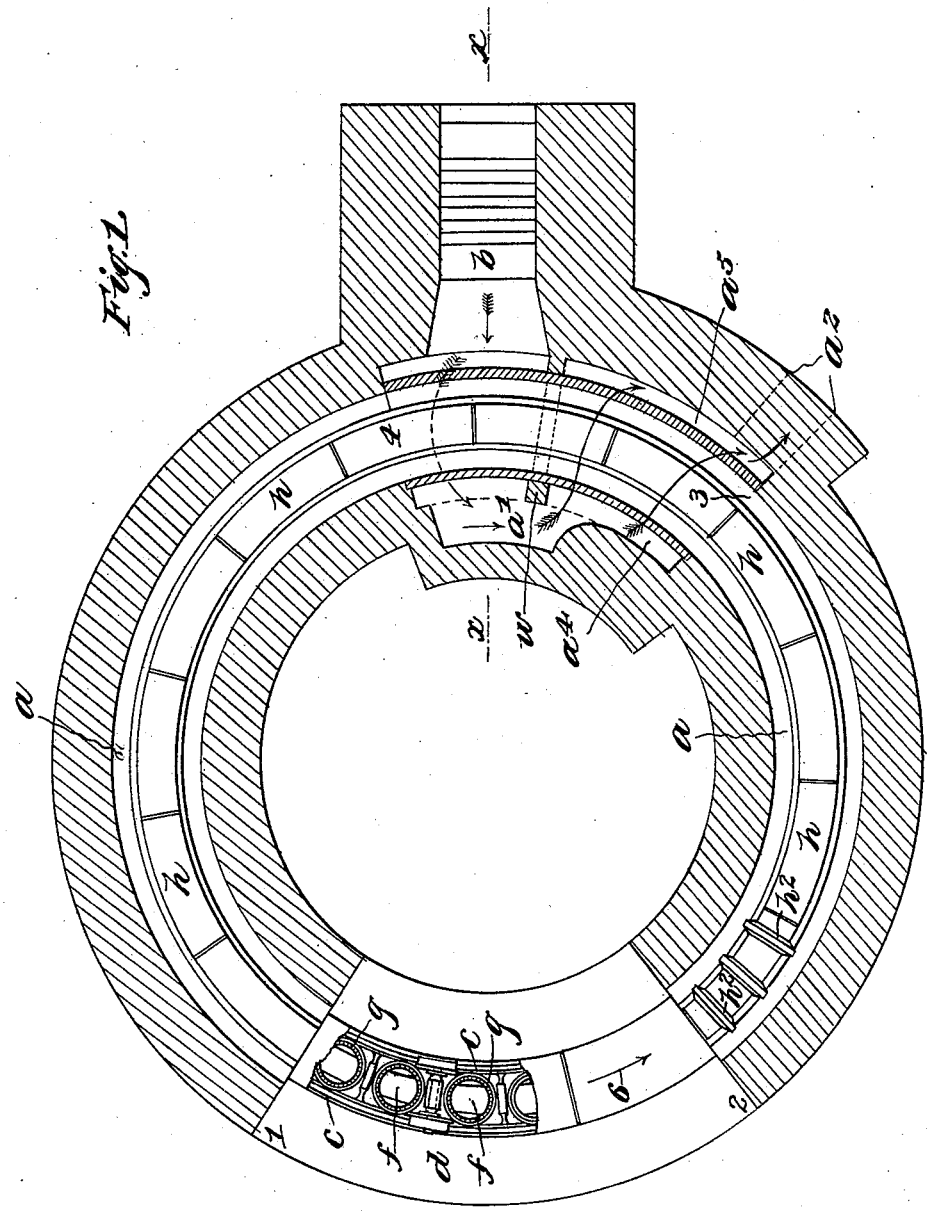
Witnesses: Inventor:
Adolf Helzel.

(No Model.) 2 Sheets—Sheet 2.
A. HELZEL.
MUFFLE FURNACE FOR TREATING GLASS OR POTTERY WARE.
No. 590,737. Patented Sept. 28, 1897.
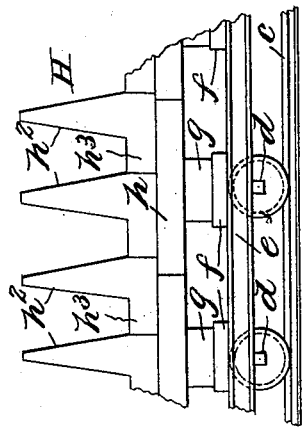
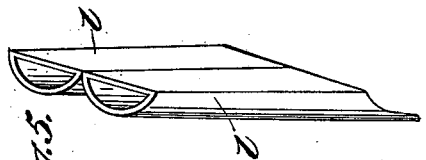
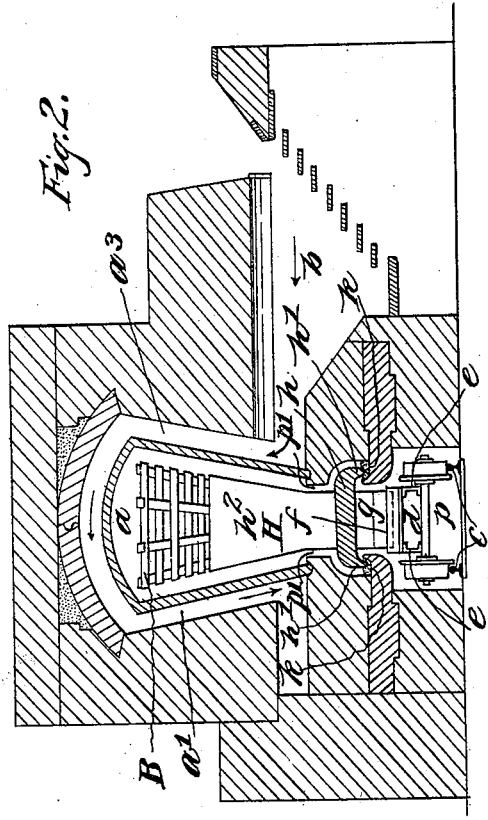
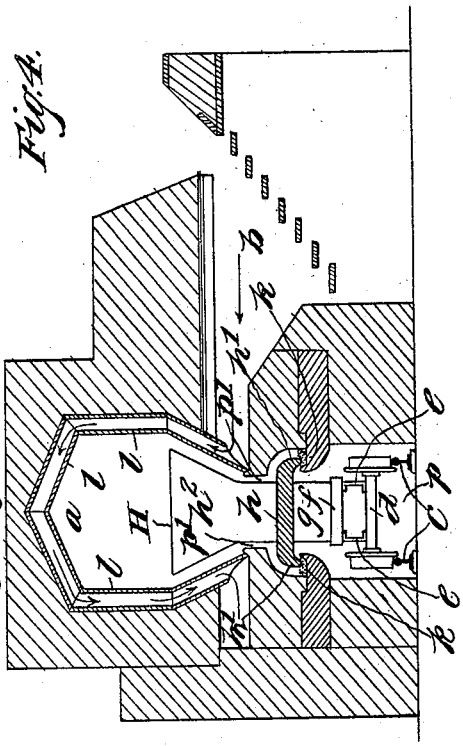
Witnesses:
Inventor:
Adolf Helzel,
By Henry Orth
Attorney.

UNITED STATES PATENT OFFICE.

ADOLF HELZEL, OF BODENBACH, AUSTRIA-HUNGARY.

MUFFLE-FURNACE FOR TREATING GLASS OR POTTERY WARE.

SPECIFICATION forming part of Letters Patent No. 590,737, dated September 28, 1897.

Application filed February 11, 1896. Serial No. 578,859. (No model.) Patented in France May 20, 1895, No. 247,554; in England May 21, 1895, No. 10,067, and in Austria June 11, 1895, No. 45/2,104.

*To all whom it may concern:*

Be it known that I, ADOLF HELZEL, a subject of the Emperor of Austria-Hungary, residing at Bodenbach, in the Province of Bohemia and Empire of Austria-Hungary, have invented certain new and useful Improvements in Muffle-Furnaces for Treating Pottery or Glass Ware, (for which patents have been obtained in Austria, dated June 11, 1895, No. 45/2,104; in France, dated May 20, 1895, No. 247,554, and in England, dated May 21, 1895, No. 10,067;) and I do hereby declare the following to be a full, clear, and exact description of the invention, such as will enable others skilled in the art to which it appertains to make and use the same, reference being had to the accompanying drawings, and to letters and figures of reference marked thereon, which form a part of this application.

My invention has relation to kilns for firing or baking earthen and porcelain ware, and more particularly to that class of continuously-operating kilns in which the sole of the kiln is movable to and from the point at which the ware is charged and discharged.

In the accompanying drawings, Figure 1 is a horizontal section of my improved kiln; Fig. 2, a section thereof, taken about on line $x\,x$ of Fig. 1. Fig. 3 is a fragmentary elevation of the movable kiln-sole and the carrier for the wares to be baked or fired. Fig. 4 is a view similar to Fig. 2, showing a different arrangement of flues for the firing-chamber; and Fig. 5 is a perspective detail view of the draft-flues around the firing chamber or space.

The kiln is of a general circular form, and its internal walls are constructed to converge in a downward direction, thus forming a circular chamber $a$, having the shape of a truncated cone in cross-section, the continuity of the kiln being interrupted by a hiatus 1 2, Fig. 1, for the introduction and removal of the ware.

Below the chamber $a$ the kiln is constructed with a circular passage $p$, that opens into said chamber $a$, and on the floor of said passage $p$ is laid a circular track of suitable rails $c$ for the carriage that supports the bed or sole $h$ of the kiln. This carriage is composed of a body constructed of U-shaped girders $e$, arranged in two concentric circles and secured to the axles $d$ for the carriage-wheels, and of a series of metallic or other plates $f$, laid crosswise on the girders $e$ and having in their upper faces a circular socket for the reception of one end of hollow short pillars $g$, upon which rests the sole proper, $h$, of the kiln.

The kiln-sole is composed of a series of slabs or tiles, preferably of fire-clay, arranged to form a circular sole and united together in any suitable manner, so as to prevent heat from within the kiln passing into the passage $p$ at the joints of said slabs or tiles. The width of the sole $h$ is considerably greater than the diameter of the supporting-pillars $g$, and said sole has along its opposite edges a downwardly-projecting flange $h'$, that dips into circular channels $k$, formed in projections in the masonry or in metal plates inserted in the masonry to form said circular channels, which are filled with sand, ashes, or the like, so that no heat can pass from the kiln-space into the passage $p$, below sole $h$, or cold air from said passage into the kiln-chamber $a$. Above the sole $h$ of the kiln the passage $p$ is contracted as much as possible, as shown at $p'$, and on said sole is erected a support H, which has substantially the form of a toothed ring, the teeth rising therefrom being of gradually-decreasing thickness in an upward direction and of a gradually-decreasing width in a downward direction to a straight portion that lies within the throat $p'$ of the circular passage $p$, the support being composed of a series of substantially L-shaped pieces $h^2$ of such form that when assembled on the sole $h$ they will form the toothed ring-support H, the horizontal member or foot-piece $h^3$ of such pieces serving as a spacing-block, as will be readily understood. The ware to be baked or fired may be set or laid on this support, or it may be contained in open-work baskets B, Fig. 2, the pieces $h^2$ being preferably made of refractory clay and the baskets of metal.

The height of the supporting-pieces $h^2$ is, as will be seen in Figs. 2 and 4, such that the ware thereon is within the upper wider and consequently hotter portion of the kiln-space $a$, and as the throat $p'$ of the circular passage $p$ is just wide enough to admit of the passage of the lower portion of the ring-support H, while the sides of the kiln-space converge to said throat, the heat will be retained in said upper portion and will be practically excluded from that part of passage $p$ between its throat and the sole $h$.

Diametrically opposite the hiatus or opening 1 2 in the kiln is arranged a combustion-chamber $b$, a suitable flue $a^3$ leading therefrom up one side of the kiln-passage and across the same at top to a downtake $a'$ on the opposite side of the kiln-chamber $a$, said flue $a'$ being connected with an uptake $a^4$, that extends across the top of the kiln-space and leads into a downtake $a^5$ on the front side of such kiln-space, the last-named flue communicating with a flue $a^2$, that is connected with a suitable stack or chimney, (not shown,) said parts of the kiln from the point 3 to the point 4, Fig. 1, forming a muffle in which the ware is baked or fired, $w$, Fig. 1, indicating the division-wall of the flues. Instead of constructing the muffle portion of the kiln as described the flues may be formed of a number of separate half-round flues $l$, Fig. 5, of fire-clay, juxtaposited so that their flat bases will form the walls of that portion of the kiln-chamber between the points 3 and 4, as shown in Fig. 4.

By means of the described construction it will readily be seen that the portion of the kiln-chamber between the points 2 3, Fig. 1, will be cool as compared with the muffle portion 3 4, so that as the green ware moves along said portion it is dried and gradually heated before it reaches the said muffle portion. This is also the case in that portion of the kiln from the point 4 to the point 1, so that as the baked or fired ware is carried from said point 4 to the hiatus 1 2 such ware is gradually cooled, so that it can readily be removed as it reaches said hiatus and green ware be substituted therefor. On the other hand, the carriage for the sole $h$ is thoroughly protected against the action of the heat in the part 3 4 of the kiln not only by the sole $h$ itself, but by the peculiar conformation of the kiln or muffle space and by the tubular supports $g$, of fire-clay, for said sole $h$.

It will also be observed that in the described construction the products of combustion cannot come in contact with the ware, so that instead of saggers for small ware open-work baskets can be used and considerable fuel saved.

There is a further advantage in giving the circular kiln-chamber the form of an inverted cone in cross-section, in that not only can the dimensions of the kiln be materially reduced, but in that the heat from the furnace can be more completely utilized. The upwardly-flowing products of combustion before they again take a downward course are caused to flow over comparatively a large roof area. This effect is heightened by the peculiar construction of the supports H, which confine the heat to the upper wider portions of the muffle, where the goods to be baked are contained, as already stated. Furthermore, the arrangement of flues is such that the products of combustion pass from the furnace to a point above the kiln-sole around one portion of the muffle, thence around another portion thereof, and again to a point above the kiln-sole, and thence directly to a stack, so that the heat is confined chiefly to the muffle and partially to the kiln-chamber above the kiln-sole, while one part of said muffle is more intensely heated than the other, the goods being thus gradually prepared to withstand the higher temperatures. This arrangement of flues with other structural features described therefore effectually protects the metallic parts below the kiln-sole from being injured by the high temperatures above said sole.

The carriage for the sole can be moved either by hand or by means of any suitable mechanical appliances.

Having thus described my invention, what I claim as new therein, and desire to secure by Letters Patent, is—

1. A circular kiln provided with a charging and discharging aperture or hiatus, an unobstructed gallery having its terminals at said hiatus, and a circularly-movable sole for said gallery, a portion of the latter diametrically opposite the aforesaid hiatus constructed in the form of a muffle, whose lateral walls converge to said sole, said muffle portion extending toward and being nearer to the entrance than the outlet of the gallery; in combination with a source of heat outside of the kiln-walls and suitable flues encompassing the muffle portion of the gallery to conduct the products of combustion around the muffle portion in the direction of the gallery-entrance without entering any portion of the gallery, for the purpose set forth.

2. A circular kiln provided with a charging and discharging aperture or hiatus, an unobstructed gallery having its terminals at said hiatus, and a circularly-movable sole for said gallery, a portion of the latter diametrically opposite the aforesaid hiatus constructed in the form of a muffle, whose lateral walls converge to said sole, said muffle portion extending toward and being nearer to the entrance than the outlet of the gallery; in combination with a source of heat outside of the kiln-walls and suitable flues encompassing the muffle portion of the gallery to conduct the products of combustion around the muffle portion in the direction of the gallery-entrance and finally to the atmosphere without entering any portion of the gallery, said flues having their intake and outlet above the kiln-sole, for the purpose set forth.

3. A circular gallery-kiln provided with a charging and discharging aperture or hiatus, an unobstructed gallery having its terminals in said hiatus, and a circularly-movable sole for said gallery, a portion of the latter, diametrically opposite the aforesaid hiatus constructed in the form of a muffle whose lateral walls converge to said sole, said muffle portion extending toward and being nearer to the entrance than the outlet of the gallery; in combination with a source of heat outside of the kiln-walls, and suitable flues to conduct the products of combustion first around the portion of the muffle farthest from, then around the portion nearest to the gallery-entrance and finally to the atmosphere without entering any portion of said gallery, said flues having their intake and outlet above the gallery-sole, and means for preventing heat passing from the gallery beneath its sole, for the purpose set forth.

4. A circular kiln provided with a charging and discharging aperture or hiatus, an unobstructed gallery having its terminals at said hiatus, a circularly-movable sole for the gallery, and a wheeled carriage for said sole, a portion of said gallery diametrically opposite the aforesaid hiatus constructed in the form of a muffle having lateral walls converging to the sole, said muffle portion extending toward and being nearer to the entrance than the outlet of the gallery, and supports for the goods corresponding in form to the cross-sectional form of said muffle and adapted to support such goods within the wider part thereof; in combination with a source of heat outside of the gallery-walls, and suitable flues to conduct the products of combustion first around a portion of the muffle farthest from, and then around a portion nearer to the gallery-entrance without passing through any portion of the gallery, thence directly to the atmosphere, said flues having their intake and outlet above the furnace-sole, and means for preventing heat passing from the gallery beneath its sole, substantially as and for the purpose set forth.

5. In a kiln such as described, a sole composed of segments of a refractory material arranged to form a continuous ring, a carriage therefor, hollow columnar supports and base-plates for the latter also of refractory material interposed between the sole and carriage, for the purpose set forth.

6. In a kiln such as described, the combination with a revoluble sole of refractory material, of supports for the goods consisting of L-shaped segments whose bases when assembled will form a continuous ring, for the purpose set forth.

7. In a kiln such as described, the combination with the sole, of supports for the goods consisting of L-shaped segments whose bases when assembled will form a continuous ring, the vertical members of said supports being wedge-shaped in cross-section, for the purpose set forth.

8. In a kiln such as described, the combination with the sole, of supports for the goods consisting of L-shaped segments whose bases when assembled will form a continuous ring, the vertical members of said supports being wedge-shaped in cross-section and in elevation of substantially the same form as the cross-sectional form of the kiln-gallery, for the purpose set forth.

In testimony whereof I affix my signature in presence of two witnesses.

ADOLF HELZEL.

Witnesses:
 GEORGE KOLB,
 ADOLPHE FISCHER.